United States Patent [19]

Feigin

[11] 4,131,585

[45] Dec. 26, 1978

[54] LEVELING AGENT FOR FLOOR POLISHES

[75] Inventor: Robert Feigin, West Orange, N.J.

[73] Assignee: Sybron Corporation, Rochester, N.Y.

[21] Appl. No.: 898,859

[22] Filed: Apr. 21, 1978

Related U.S. Application Data

[63] Continuation-in-part of Ser. No. 741,544, Nov. 15, 1976, abandoned.

[51] Int. Cl.² .............................................. C09G 1/16
[52] U.S. Cl. ............................. 260/29.6 MQ; 106/6; 106/237; 260/29.6 ME; 260/29.6 RB; 260/27 R
[58] Field of Search ............ 260/29.6 ME, 29.6 MQ, 260/29.6 RB, 27 R; 106/6, 237

[56] References Cited

U.S. PATENT DOCUMENTS

| | | | |
|---|---|---|---|
| 3,216,962 | 11/1965 | Gatza | 260/29.6 ME |
| 3,300,321 | 1/1967 | Rosenberg et al. | 106/6 |
| 3,306,869 | 2/1967 | Lahr et al. | 260/2.6 MQ |
| 3,406,133 | 10/1968 | Hartshorn | 106/6 |
| 3,429,842 | 2/1969 | Wolstoncroft | 106/6 |
| 3,438,925 | 4/1969 | Raynolds et al. | 260/29.6 MQ |
| 3,728,418 | 4/1973 | Gleason | 260/27 R |
| 3,843,583 | 10/1974 | Gibbs et al. | 260/29.6 MQ |
| 3,957,712 | 5/1976 | Heyden et al. | 260/29.6 ME |

*Primary Examiner*—Ronald W. Griffin
*Attorney, Agent, or Firm*—Theodore B. Roessel; Owen D. Marjama; Papan Devnani

[57] ABSTRACT

A novel leveling agent for self polishing dry-bright floor polishes having the following general structure is described:

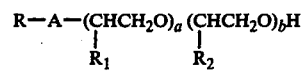

where R is either a non-linear aliphatic hydrocarbon or mixture of hydrocarbons containing 8 to 15 carbon atoms or an alkylbenzene moiety containing 8 to 12 carbon atoms in the alkyl chain
  A is either Oxygen or Sulfur atom
  $R_1$ is either Hydrogen atom or $CH_3$
  $R_2$ is either Hydrogen atom or $CH_3$
  a and b are small numbers or average numbers totaling no more than about 7 so that the solubility of the compounds is less than about 0.4% in water at room or application temperature, but when R is alkylbenzene moiety, A is oxygen atom only and $R_1$ and $R_2$ are hydrogen atoms only.

3 Claims, No Drawings

LEVELING AGENT FOR FLOOR POLISHES

BACKGROUND OF THE INVENTION

This application is a continuation-in-part of U.S. application Ser. No. 741,544, filed Nov. 15, 1976, now abandoned.

This invention relates to novel plasticizer compounds which serve as additives for producing improved emulsion floor polishes that dry to a bright finish without buffing. Polymer emulsion floor polishes are relatively complex formulations in which minor amounts of additives play a major role in performance. It is known in the art that floor polishes having high gloss have a tendency to cause streaking.

It is the object of this invention to eliminate streaking in floor polishes without sacrificing high gloss by incorporating a new, better and efficient additive of the following structure:

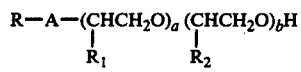

where R = a non-linear aliphatic hydrocarbon or mixture of hydrocarbons containing 8 to 15 carbon atoms or an alkylbenzene moiety containing 8 to 12 carbon atoms in the alkyl chain.

A = oxygen, sulfur
$R_1$ = H, $CH_3$
$R_2$ = H, $CH_3$
a + b = 7 or less so that the solubility of the compounds is less than about 0.4% in water at room or application temperature but when R is an alkylbenzene moiety, A is oxygen atom only and $R_1$ $R_2$ are hydrogen atoms only.

The feature of this invention is to provide an improved polishing composition driable to a bright surface without requiring buffing, comprising solids, synthetic polymers, coalescing agents and surface tension depressants in an aqueous vehicle. Depending upon competitive features, cost and performance, the individual ingredients may vary considerably and include various additives for hardness, gloss, durability, spreading, etc.

The solids content is usually in the range of 10-40% of the total weight while the preferred compositions generally contain 14-18%.

Synthetic polymers may make up 50% or more of the solids. Typical of these is a copolymer of styrene, an acrylic ester and a functional acid.

Commonly employed also are alkali-soluble resins, both natural and synthetic, in amounts up to as much as 50% but generally 20% of the solids. These include shellac, copal gums, maleic-modified styrene or rosin derivatives.

Coalescing agents, such as glycols ethers, pyrrolidone and similar water-soluble volatiles are used in small amounts, e.g., 3% of solids weight.

Fluorocarbon type surface tension depressants such as Zonyl S-13 (Reg'd TM of DuPont), Fluorad FC-123, 134 or 170 (Reg'd TM of 3M Corp) in the range of about 0.02-0.15% of solids are added to assist in leveling.

Ammonia and volatile amines as fugitive alkalies, are used as needed to solubilize fatty acids, various resins and polymers. Salts of heavy metals such as zinc and zirconium sometimes are incorporated to provide detergent-resistant formulations, which can be removed with ammoniated cleaners.

Plasticizers are a very important ingredient in all polish formulations. They provide gloss, eliminate crazing, powdering of the dried films, and streaking, thus promoting a level finish. Tributoxyethyl phosphate is used in most polishes, but often supplemented with conventional adipate or phthalate esters and other commercial plasticizers.

In general, self-polishing products are formulated to provide a non-slip protective film with little or no color, that has high gloss with good resistance to water-spotting, is detergent-resistant for damp mopping, is odorless, and has a good cost structure. I have found that ethoxylated and propoxylated derivatives of commercially available oxo process alcohols containing various non-linear or branched chains or ethoxylated derivatives of the commercially available $C_8$-$C_{12}$ alkylphenols perform especially well in these formulations as leveling agents. These derivatives are readily prepared using conventional techniques by adding ethylene and/or propylene oxide to the alcohol or ethylene oxide to the alkylphenol containing a catalyst, generally an alkali, under pressure at elevated temperatures until the desired quantities of the oxides are consumed. The sequence of addition when using both oxides for preparation of a product suitable for the described applications is not a factor except, of course, for synthesizing a particular molecule. Heteric polymers also perform satisfactorily. Analogous alkoxylated condensation derivatives of linear alcohols are not only ineffective but usually detrimental and inoperative for the intended application.

It has been observed that the alkoxylates of this invention, like all ethers tend to form peroxides, especially upon prolonged storage. In keeping with good industrial practice it is desirable to incorporate an inhibitor, either an anti-oxidant or reducing agent, to prevent or limit the build-up of peroxides. Investigation of the effect of peroxides revealed the surprising fact that peroxides in the finished emulsion polishes hurt both the leveling and gloss properties of the films. This appears to be true of most polishes even when other plasticizers are used. Peroxides may be present from peroxides incorporated in redox polymer emulsion manufacture, from hydrogen peroxide bleaches of certain components of the polishes or from atmospheric oxygen reaction. The effect appears to have been unknown or unrecognized previously, perhaps because the use of formaldehyde as a preservative in most polishes tends to eliminate most of the peroxides.

The difference in performance in polishes with and without peroxides can be demonstrated by taking a properly formulated polish which has been aged and aerated. If a small amount of sodium sulfite, e.g, 0.1% of the total by weight is added to a portion of the polish and then films are applied on floor tiles with each of the emulsions, the latter material will provide a level and glossy film while the untreated emulsion film will be inferior in these properties.

The number of moles of ethylene oxide is limited to a maximum of about 7 per mole of hydrophobe only to insure proper resistance to detergents and water-spotting of the applied polishes. Actually, films containing more will still provide adequate leveling and gloss. Plasticizers containing more than about 7 propylene oxide units are too difficult to incorporate.

The following are typical products suitable for use as plasticizers according to this invention:

(For brevity EO = ethylene oxide, PO = propylene oxide)
Tert-dodecylmercaptan plus 3 or 6 moles EO
Tert-dodecylmercaptan plus 3 or 6 moles PO
p-diisobutylphenol plus 3 or 6 moles EO
p-dodecylphenol plus 6 moles EO
Oxo process isooctyl alcohol plus 2 moles EO or 3 moles PO
Oxo process isodecyl alcohol plus 2 moles EO or 2 moles PO
Oxo process isodecyl alcohol plus 2 moles EO + 3 moles EO
Oxo process isodecyl alcohol plus 2 moles PO + 3 moles PO
Oxo process isotridecyl alcohol plus 6 moles EO
2,6,8-trimethyl-4-nonanol plus 6 moles EO The formulator has the choice of incorporating suitable commercially available antioxidants such as the phenolic type, e.g., 2,6-di-tertiary-butyl-para-cresol, butylated hydroxyanisole and the like, or fatty hydrazides at about 1000 parts per million into the plasticizer. He may choose to use an inhibitor or reducing agent up to about 0.2% by weight in the finished emulsion. Formaldehyde, used as a preservative against bacterial growth, is, of course, helpful. Hydrazine, hydrazides, sodium sulfite or bisulfite are typical effective peroxide inhibitors.

Following are typical polish formulations and evaluations:

EXAMPLE I
EXAMPLE 1

| | |
|---|---|
| Water | 54.6 parts |
| 1% Anionic fluorocarbon surfactant solution (0) | 0.8 |
| 37% Formaldehyde solution | 0.2 |
| Diethyleneglycol monoethyl ether | 2.5 |
| 38% Styrene-acrylic copolymer emulsion (1) | 31.7 |
| 40% Anionic polyethylene emulsion (2) | 3.7 |
| 15% Ammonia neutralized rosin-maleic anhydride resin (3) | 10.0 |
| Leveling Agent | 0.7 |
| Total | 104.2 parts |

(0) FC 128 (Reg. TM of 3M Company)
(1) Contains the following:

| Monomer | Parts by Weight |
|---|---|
| Styrene | 41.7 |
| Methyl Methacrylate | 6.2 |
| Acrylonitrile | 6.2 |
| Methyl Acrylate | 8.5 |
| Ethyl Acrylate | 37.4 |
| Zn as Zinc Ammonium Carbonate | .65 |

(2) Emulsion polymerized using sodium dodecylbenzene sulfonate as emulsifier. Poly-EM 41 (Reg. TM of Cosden Oil & Chemical Co.),
(3) Pentalyn 255 (Reg. TM of Hercules, Inc).

Three examples of Example I were prepared using a different leveling agent in each one of them.

A. Contained tributoxyethyl phosphate.
B. Contained ethylene oxide adduct (3EO) of isodecyl alcohol.
C. Contained equal parts of ethylene oxide adduct (2EO) of isodecyl alcohol and (3EO) of isotridecyl alcohol.

The polishes were applied on separate floor tiles of black and of white vinyl asbestos compositions. In all cases the (B) and (C) polishes were equal to the reference standard (A) with respect to gloss, leveling, water resistance, heelmark resistance, powdering resistance, but were slightly superior to (A) in detergent resistance when washed with a 1% solution of Spic and Span (Reg'd TM of Proctor and Gamble), a common household detergent. Removability, as tested on the Gardner Straight Line Washability and Abrasion Machine using 1% solution of Spic and Span with 1% added concentrated ammonia was 100% at 40 cycles with (B) and 80% at 50 cycles with the standard (A) and (C) formulations. Accelerated storage stability tested at 125° F for 90 days showed no changes in all products.

The amount of leveling agent as % of dry polymers is as follows:

| Dry Polymers | | | |
|---|---|---|---|
| Styrene-acrylic copolymer | 31.7 × .38 | = | 12.05 |
| Polyethylene | 3.7 × .4 | = | 1.48 |
| Rosin-maleic anhydride resin | 10 × .15 | = | 1.5 |
| Total dry polymers | | | 15.03 |
| | | 7 | |
| Leveling Agent as % of dry polymers = | .1503 | = | 4.66 |

EXAMPLE II

| | |
|---|---|
| Water | 125 parts |
| 38% Acrylic polymer emulsion (1) | 75 |
| 15% Ammonia neutralized styrene-maleic partial ester (2) | 24 |
| 25% Nonionic emulsion of polyethylene-acrylic copolymer (3) | 15 |
| Diethylene glycol monoethylether | 4 |
| 1% solution anionic fluorocarbon surfactant (4) | 1.5 |
| 37% Formaldehyde solution | 0.5 |
| Leveling Agent | 2.5 |
| | 247.5 |

(1) Contains the following:

| Monomer | Parts by Weight |
|---|---|
| Ethyl Acrylate | 94.6 |
| Acrylonitrile | 5.0 |
| Itaconic Acid | 0.4 |
| Zn Ammonium Carbonate (ZnO equivalent 0.2) | 0.8 |

(2) SMA-2625A (Reg. TM of Arco Chemicals)
(3) AC-540 (Reg. TM of Allied Chemical Co.)
(4) FC-128 (Reg. TM of 3M Corp.)

Four samples of Example II were prepared using the following as leveling agents:
(A) Contained tributoxyethyl phosphate
(B) Contained propylene oxide adduct (2PO) of isodecyl alcohol
(C) Contained propylene oxide adduct (3PO) of isodecyl alcohol
(D) Contained propylene oxide adduct (4PO) or isodecyl alcohol. Application on flooring tiles and evaluations were performed as in Example 1. In over-all performance the polishes were essentially equal.

The amount of leveling agent as % of dry polymers is as follows:

| Dry Polymers | | | |
|---|---|---|---|
| Acrylic Polymer | 75 × .38 | = | 28.50 |
| Styrene-Maleic Partial Ester | 24 × .15 | = | 3.60 |
| Polyethylene Acrylic Copolymer | 15 × .25 | = | 3.75 |
| Total dry polymers | | | 35.85 |
| | 2.5 | | |

-continued

| | | | |
|---|---|---|---|
| Leveling Agent as % of dry polymers = | | .3585 = | 6.97 |

EXAMPLE III

| | |
|---|---|
| Water | 120 parts |
| 38% Acrylic/methacrylic acid copolymer (1) | 108 |
| 15% Ammonia neutralized styrene-maleic partial ester (2) | 72 |
| Hexylene glycol | 6 |
| 2-Pyrollidone | 6 |
| Diethylene glycol monoethyl ether | 6 |
| 1% solution of anionic fluorocarbon surfactant (3) | 0.5 |
| 37% formaldehyde solution | 0.5 |
| Leveling Agent | 6 |
| Total | 325 |

(1) Contains the following:

| Monomer | Parts by Weight |
|---|---|
| Methyl Methacrylate | 65.2 |
| Butyl Acrylate | 24.8 |
| Methacrylate Acid | 10.0 |
| Zn Ammonium Carbonate (ZnO equivalent 1.0) | 4.0 |

(2) SMA-2625A (Reg. TM of Arco Chemical Co.)
(3) FC-128 (Reg. TM of 3M Corp)

The composition was prepared using as leveling agent the same additives A, B, C, D of Example 2. The applications were evaluated as previously and in over-all performance the polishes were essentially equal.

The amount of leveling agent as % of dry polymers is as follows:

| | | | |
|---|---|---|---|
| Dry Polymers: | | | |
| Acrylic/methacrylic acid copolymer | 108 × .38 | = | 41.04 |
| Styrene-maleic partial ester | 72 × .15 | = | 10.80 |
| Total dry polymer | | | 51.84 |
| | | 6 | |
| Leveling agent as % of dry polymer = | | .5184 = | 11.57 |

EXAMPLE IV

| | |
|---|---|
| Water | 171 parts |
| 38% styrene-acrylic copolymer emulsion (1) | 150 |
| 25% anionic polyethylene-acrylic copolymer emulsion (2) | 29 |
| 15% ammonia neutralized rosin-maleic partial ester (3) | 48 |
| Caprolactam | 4.8 |
| Diethylene glycol monoethyl ether | 6.3 |
| 1% solution of anionic fluorocarbon surfactant | 1.9 |
| 37% formaldehyde solution | 0.6 |
| Leveling Agent | 3.4 |
| Total | 415.0 parts |

(1) Same emulsion as in Example 1.
(2) AC-540 (Reg. TM of Allied Chemical Co) using soap emulsifier.
(3) Pentalyn 255, (Reg. TM of Hercules Inc)

The formulations were compounded using the following as leveling agents:
(A) Contained tributoxyethyl phosphate
(B) Contained adduct of isodecyl alcohol — 2PO first, then 3EO.

As in the previous examples applications were made on various floor tiles and evaluated. The polishes made with (B) showed performance features superior to the control (A) with respect to gloss, water spotting, heel-mark resistance and removability while being equal in other respects.

The amount of leveling agent as % of dry polymers is as follows:

| | | | |
|---|---|---|---|
| Dry Polymers: | | | |
| Styrene acrylic copolymer | 150 × .38 | = | 57 |
| Polyethylene acrylic copolymer | 29 × .25 | = | 7.25 |
| rosin-maleic partial ester | 48 × 1.5 | = | 7.2 |
| Total dry polymer | | | 71.45 |
| | | 3.4 | |
| Leveling agent as % of dry polymer = | | .7145 = | 4.76 |

In the preferred embodiment as evidenced by the above examples, the calculated percentage of leveling agent as % of total dry polymers is from 4.66 to 11.57. However, the formulation would easily permit the leveling agent to be incorporated in the range of 2.5 to 15% of total dry polymers.

Many other examples can be made using various other leveling agents of this invention. It should be noted, however, that the use of the additives as set forth in the claims is not for correcting a basically deficient or defective formulation. The formulations, before the addition of these products, must have sufficient built-in properties such that the additives serve to augment the desired values as to leveling and gloss without detracting from other properties such as water spotting and detergent removal. The examples given were also originally formulated to give satisfactory results when tributoxyethyl phosphate was used. It is not unreasonable to believe that modifications based upon the use of the products of this invention might lead to other superior effects. The leveling agents additive of this invention may also be used as a paint additive and a defoamer.

I claim:

1. A high gloss non-streaking floor polish in emulsion form comprising a polymer selected from a group consisting of homopolymers and copolymers of styrene, acrylic homopolymers and lesser proportions of at least a second polymer and 2.5 to 15% by weight of the total dry polymers a leveling agent having the following formula:

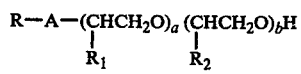

where R = a non-linear aliphatic hydrocarbon or mixture of hydrocarbons containing 8 to 15 carbon atoms in the alkyl chain or an alkylbenzene moiety containing 8 to 12 carbon atoms in the alkyl chain, A = O, S
$R_1$ = H, $CH_3$
$R_2$ = H, $CH_3$
a + b = 7 or less so that the solubility of the compounds is less than about 0.4% in water at room or application temperature but when R is an alkylbenzene moiety, A is oxygen atom only and $R_1$ and $R_2$ are hydrogen atoms.

2. The floor polish emulsion of claim 1 wherein the leveling agent is an adduct of 2 moles of propylene oxide and one mole of adduct of isodecyl alcohol.

3. The floor polish emulsion of claim 1 wherein the leveling agent is an adduct of 1 mole of isodecyl alcohol and about 2 moles of propylene oxide first and then about 3 moles of ethylene oxide.

* * * * *